Figure 1:
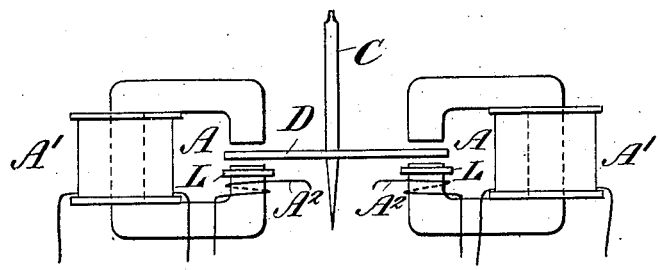

No. 652,454. Patented June 26, 1900.
E. BATAULT.
ALTERNATING CURRENT ELECTRIC METER.
(Application filed Aug. 2, 1898.)

(No Model.) 2 Sheets—Sheet 1.

WITNESSES:

INVENTOR
Émile Batault
BY
E. M. Marble & Son
ATTORNEYS

No. 652,454. Patented June 26, 1900.
E. BATAULT.
ALTERNATING CURRENT ELECTRIC METER.
(Application filed Aug. 2, 1898.)
(No Model.) 2 Sheets—Sheet 2.
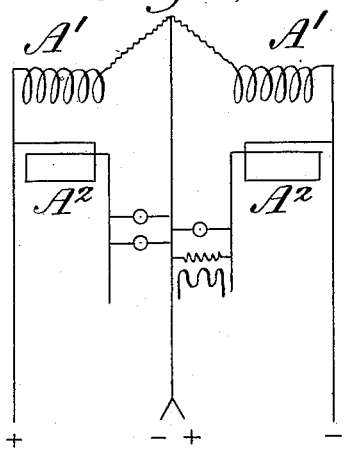
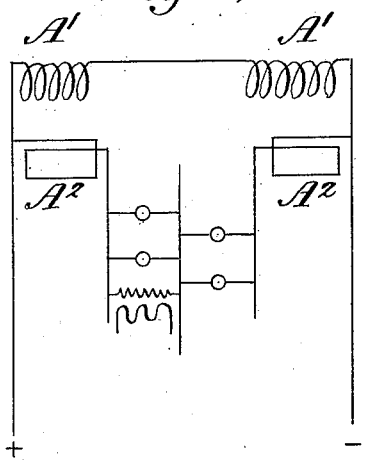
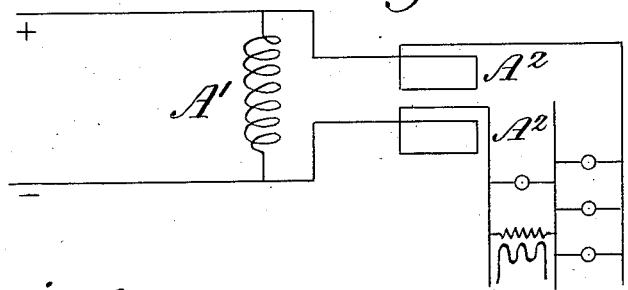
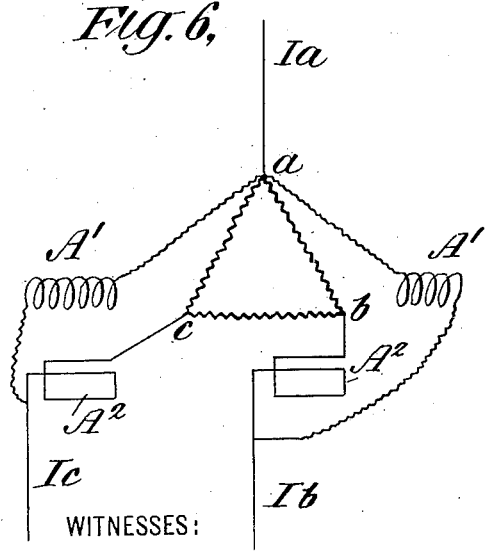
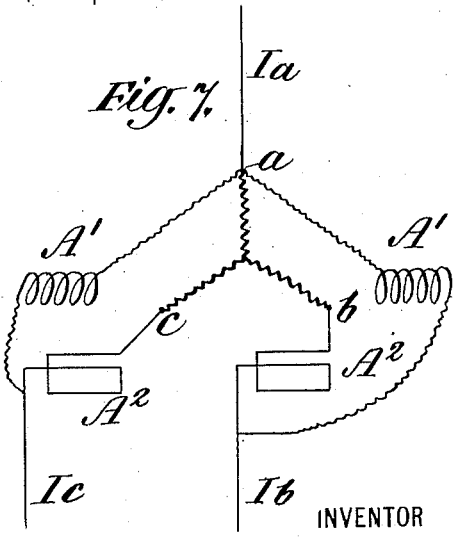
WITNESSES:
INVENTOR
Émile Batault
BY
ATTORNEYS

UNITED STATES PATENT OFFICE.

EMILE BATAULT, OF GENEVA, SWITZERLAND.

ALTERNATING-CURRENT ELECTRIC METER.

SPECIFICATION forming part of Letters Patent No. 652,454, dated June 26, 1900.

Application filed August 2, 1898. Serial No. 687,560½. (No model.)

*To all whom it may concern:*

Be it known that I, EMILE BATAULT, a citizen of the Swiss Republic, residing at No. 6 Rue de Universite, Geneva, in the canton of Geneva, Republic of Switzerland, have invented a certain new and useful Improvement in Alternating-Current Electric Meters, of which the following is a specification.

My invention relates to various new and useful improvements in alternating-current electric meters of the type described in my application for Letters Patent filed August 2, 1898, and numbered serially 687,559½.

I have discovered that a simple and accurate meter for measuring alternating currents can be obtained by employing a rotating armature connected to a suitable register and influenced by magnetic fields differing in phase induced by shunt and series coils, the series coils being located within, but eccentrically to, the field of influence of the shunt-coils—as, for example, by being wound upon a portion only of the core of the shunt-coils. In order that a starting torque may be produced to enable the motor to start on minimum loads, I describe in said application a pivoted armature located above the cores and between which and the cores the rotating armature is situated, the starting torque being adjustable by varying the inclination of the pivoted armature with respect to the axis of the core. The employment of a pivoted armature also tends to prevent false movements of the rotary armature when no current is energizing the series coils. I have discovered that in alternating meters of this type when the pole-pieces of the actuating-coils are so located that the magnetic field passes through the rotary armature no rotation of the armature is effected when the pole-pieces of the magnet or magnets are placed in line with the center of rotation of the rotating armature, or, in other words, if a rotating disk is employed, when the pole-pieces of the magnet or magnets are in the line of the diameter of said disk. If, however, the pole-pieces of the magnet or magnets are arranged out of the line of the center of rotation of the armature, the latter will be driven in one direction, while if the pole-pieces are moved in a direction on the opposite side of the center of rotation the armature will be driven in the opposite direction, while by varying the deflection of the pole-pieces to one side or the other of the center of rotation the torque produced will be varied. In either case there is no distortion of the lines of force of the magnet or magnets and apparently no difference in the way in which the said lines of force pass through the armature, and although the operation takes place as explained I am not able to positively determine the cause of such movement.

The object of my present improvement is to provide a simple alternating meter capable of accurate operation with single-phase or multiphase currents which shall be simple in construction and which consumes only a small amount of current in its operation, wherein the starting tongue may be varied and wherein the armature responds to currents of a minimum value. To effect this object, I employ a meter having in combination a suitable register device and an impulsion-motor actuated by the currents to be measured. This motor comprises a rotatable armature, preferably in the form of a disk, and one or more operating-magnets, each having a shunt and one or more series coils, the latter being arranged within, but eccentrically to, the field of influence of the shunt-coils. The magnets are of a construction to permit the lines of force to pass directly through the armature, and with the case of a disk the said magnets will be preferably the usual C shape. One or both of the magnets will be arranged to be adjusted out of the line of the center of rotation of the armature, whereby the operation referred to will be effected.

In order that the invention may be better understood, attention is directed to the accompanying drawings, forming part of this specification, in which—

Figure 2:
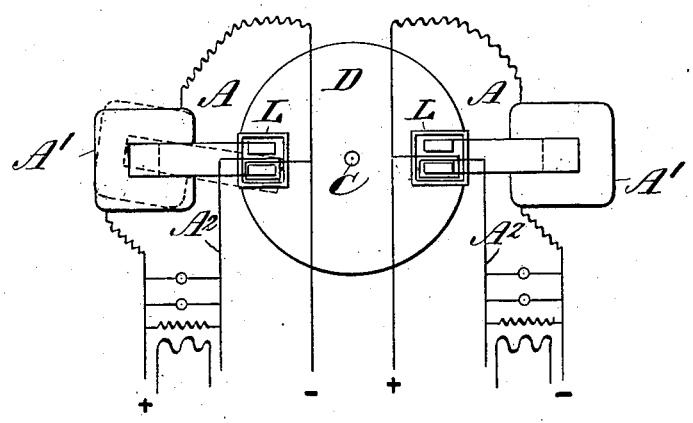

Figure 1 is an elevation of the impulsion-motor for operating the register; Fig. 2, a plan view thereof, showing the connections for a two-phase four-conductor circuit; Fig. 3, a diagram illustrating the connections for a two-phase three-wire distribution system; Fig. 4, a similar view showing the connections for a single-phase three-wire distribution system;

Fig. 5, a similar view showing only a single shunt-coil; Figs. 6 and 7, diagrams illustrating the connections for three-phase circuits.

In all of the above views corresponding parts are represented by the same letters of reference.

A A represent two C-shaped magnets, having shunt-coils A' A' thereon. I show one of the poles at each of the magnets divided into two parts, one of said parts carrying the series coils $A^2$, of coarse wire and of relatively-few turns. The shunt-coils A' are connected across the mains and are influenced by the pressure of the circuit. The series coil or coils are connected in series with each other and with the work and are influenced by the current to be measured.

C is a shaft mounted in antifriction-bearings and having suitable connection with the register. (Not shown.)

D is a disk armature carried by the shaft and working between the poles of the magnets A A. The armature may be of any other type. By subjecting the series and shunt coils to the action of alternating currents magnetic fields will be induced in the armature D differing in phase and resulting in the generation of Foucault currents, which cause its rotation. The speed of rotation will be dependent upon the current to be measured.

In order to increase the efficiency of the meter with highly-inductive currents, a closed conductor L may be arranged above the series coils to entirely circle the corresponding pole-piece of the magnets. One or both of the magnets A are adjustable, as shown in dotted lines, Fig. 2, whereby the pole-pieces may be moved out of line with the center of rotation of the armature.

In Fig. 2 the connections are such that each magnet, with a shunt and series coil, is influenced by the pressure and amperage of one side of a two-phase four-wire system.

In Fig. 3 the shunt-coils are connected across the outside wires of a two-phase three-wire system, the series coils being connected in series with the working conductors.

In Fig. 4, showing an ordinary single-phase three-wire system, the shunt-coils are connected across the outside conductors and the series coils are connected in series with the outside conductors, translating devices, and the compensating-wire.

The connections in Fig. 5 are the same as in Fig. 4, except that only a single shunt-coil is shown, two series coils being wound upon separate sections of a single magnet, the windings of the series coils being such as to induce poles of opposite polarity in the armature.

In Figs. 6 and 7, showing the connections of my improved meter in a three-phase system, the shunt-coils are connected across the outside and middle conductors, while the series coils are in series with the outside conductors.

It will be understood that in practice the connections of the meter may be varied, the form of the magnets changed, and the type of armature modified without departing from the essential spirit of my invention.

Having now described my invention, what I claim as new, and desire to secure by Letters Patent, is the following:

1. In an electric meter for alternating currents, the combination with a revolubly-mounted conducting-body, of series and shunt coils connected to the supply-conductors and producing magnetic fields through which the conducting-body passes, thereby causing said body to rotate, and a core common to both of said coils laterally adjustable with respect to the center of rotation of the conducting-body, whereby the starting torque of the latter may be varied, substantially as described.

2. In an electric meter for alternating currents, the combination with a disk armature, of a magnet laterally adjustable with respect to the diameter of the disk, and series and shunt coils carried by said magnet, substantially as set forth.

3. In an electric meter for alternating currents, the combination with a disk armature, of a magnet laterally adjustable with respect to the diameter of the disk, and series and shunt coils carried by said magnet, the series coils being located within, but eccentrically to, the field of influence of the shunt-coils, substantially as set forth.

4. In an electric meter for alternating currents, the combination with a disk armature, of a magnet having poles disposed opposite to the said disk, said magnet being adjustable laterally with respect to the diameter of the disk, and series and shunt coils carried by the magnet, substantially as set forth.

5. In an electric meter for alternating currents, the combination with a disk armature, of a magnet having poles disposed opposite to the said disk, said magnet being adjustable laterally with respect to the diameter of the disk, and series and shunt coils carried by the magnet, the series coils being located within, but eccentrically to, the field of influence of the shunt-magnet, substantially as set forth.

6. In an electric meter for alternating currents, the combination with a revolubly-mounted conducting-body, of an electromagnet having series and shunt coils adapted to be connected to the supply-conductors, said magnet being adjustable relatively to the center of rotation of the conducting-body, and a closed conducting-circuit surrounding the magnetic pole, substantially as set forth.

7. In an electric meter for alternating currents, the combination with a revolubly-mounted conducting-body, of two electromagnetic devices each carrying series and shunt coils adapted to be connected with the supply-conductors and producing magnetic fields through which the conducting-body passes, thereby causing said body to rotate, one of said magnetic devices being laterally adjustable, whereby the starting torque of the motor may be varied, substantially as set forth.

8. In an electric meter for alternating currents, the combination with a revolubly-mounted conducting-body, of an electromagnetic device having series and shunt coils and adapted to be connected to the supply-conductors, said magnetic device being adjustable relatively to the center of rotation of the conducting-body, and a closed conducting-circuit surrounding the magnetic pole, substantially as set forth.

9. In an electric meter for alternating currents, the combination with a revolubly-mounted conducting-body, of an electromagnetic device having a shunt-coil and an eccentrically-arranged series coil and a secondary closed coil and adapted to be connected to the supply-conductors, said magnetic device being adjustable relatively to the center of rotation of the conducting-body, substantially as set forth.

In testimony whereof I affix my signature in the presence of two witnesses.

EMILE BATAULT.

Witnesses:
 THEODORE BRET,
 F. BADEL.